United States Patent [19]

Ceh et al.

[11] Patent Number: 5,276,202

[45] Date of Patent: Jan. 4, 1994

[54] ORGANIC PEROXIDE COMPOSITIONS AND PROCESS THEREFOR

[75] Inventors: Michele S. Ceh, Sheffield Lake, Ohio; Jim D. Byers, Bartlesville, Okla.

[73] Assignee: Phillips Petroleum Company, Bartlesville, Okla.

[21] Appl. No.: 23,425

[22] Filed: Feb. 23, 1993

[51] Int. Cl.$^5$ .............................................. C07G 40/00
[52] U.S. Cl. ...................................... 568/559; 568/558
[58] Field of Search .................................. 568/558, 559

[56] References Cited

U.S. PATENT DOCUMENTS

| T998,005 | 9/1980 | Orwoll et al. | 568/559 |
|---|---|---|---|
| 2,858,280 | 10/1958 | Maltha | 252/426 |
| 3,538,011 | 11/1970 | Klasuw | 252/186 |
| 4,255,277 | 3/1981 | Smearing | 568/559 |
| 4,376,218 | 3/1983 | Izzard et al. | 568/559 |
| 4,734,135 | 3/1988 | Satomi et al. | 568/559 |

*Primary Examiner*—Werren B. Lone
*Attorney, Agent, or Firm*—Lucas K. Shay

[57] ABSTRACT

A substantially water-free, non-dusting and flowable composition comprising an organic peroxide, a hydrocarbyl phthalate, and at least one phlegmatization agent is provided wherein the phlegmatization agent is selected from the group consisting of a polyester and a glycol-based aliphatic carboxylic acid ester, and mixtures thereof. The composition is prepared by: (1) substantially dissolving the hydrocarbyl phthalate and phlegmatization agent in a solvent to form a plasticizer mixture; (2) substantially dissolving the organic peroxide in the plasticizer mixture to form an organic peroxide-plasticizer mixture; (3) cooling the organic peroxide-plasticizer mixture whereby a crystallized composition is formed; and (4) recovering the crystallized composition.

29 Claims, No Drawings

ORGANIC PEROXIDE COMPOSITIONS AND PROCESS THEREFOR

FIELD OF THE INVENTION

The present invention relates to a composition comprising an organic peroxide and a process for preparing the composition.

BACKGROUND OF THE INVENTION

Organic peroxides such as, for example, dibenzoyl peroxide are useful as, among others, initiators in polymerization processes. Because of the flammable and explosive nature as well as high shock-sensitivity of organic peroxides, organic peroxides generally are diluted with inert substances such as, for example, plasticizers. See Kirk-Othmer Encyclopedia of Chemical Technology, Third Edition, Vol. 18, pages 111–183 (1982). Also because of the dangerous properties of the organic peroxides, the United States Department of Transportation requires yellow organic peroxide labels for organic peroxide compositions having greater than 35 weight % of organic peroxide levels. A phlegmatization process to reduce the organic peroxide levels in the compositions to lower than 35% so that no yellow labels are required for shipping and storage is very desirable.

However, attempts to reduce the organic peroxide levels to below 35% by increasing a plasticizer such as, for example, dicyclohexyl phthalate were unsuccessful because the resulting compositions were found to yield parts with splotchy areas and brittleness. In others words, an organic peroxide composition which does not require yellow labels cannot be produced by increasing the concentration of the plasticizer.

Organic peroxide compositions are also commercially available in paste forms containing butyl benzyl phthalate or dibutyl phthalate as plasticizer. These paste forms have a tendency to separate into phases and are difficult to accurately measure. Dibenzoyl peroxide is commonly available as a wetted granular material in which the water acts to reduce the shock-sensitivity. However, for some polymerization processes such as, for instance, the curing of polymers, the presence of water in the peroxide is often unacceptable because water can often react with the polymers in the polymerization process causing undesirable results.

It would therefore be a significant contribution to the art if an organic peroxide composition that is substantially water-free, non-dusting, flowable, and safe during storage, shipping and handling (i.e., does not require yellow labels), can be developed.

SUMMARY OF THE INVENTION

An object of the present invention is to provide a substantially water-free, non-dusting and flowable solid organic peroxide composition. Another object of the present invention is to provide an organic peroxide composition having a good solubility in unsaturated polyester and vinyl resins. A further object of the present invention is to provide a process for preparing a substantially water-fee, non-dusting and flowable organic peroxide composition in high yield. An advantage of the present invention is that the organic peroxide composition of the invention will have benefits in applications where a granular organic peroxide is required and where the presence of water cannot be tolerated. Another advantage of the present invention is that the plasticizers used in the present invention function as plasticizers in the cured part of the composition. A further advantage of the invention is that the organic peroxide compositions of the invention do not require yellow labels described above and have enhanced safety in storage, use, and handling. Other objects, advantages and features will become more apparent as the invention is disclosed more fully hereinbelow.

According to the present invention, a composition is provided which comprises an organic peroxide, a hydrocarbyl phthalate, and at least one phlegmatization agent selected from the group consisting of polyester, glycol-based aliphatic carboxylic acid esters, and mixtures thereof; wherein the composition can be prepared by the steps comprising: (1) substantially dissolving a hydrocarbyl phthalate and at least one phlegmatization agent in a solvent to form a plasticizer mixture; (2) substantially dissolving an organic peroxide in the plasticizer mixture to form an organic peroxide-plasticizer mixture; (3) cooling the organic peroxide-plasticizer mixture to crystallize the composition; and (4) recovering the composition.

DETAILED DESCRIPTION OF THE INVENTION

The present invention provides a composition comprising an organic peroxide, a hydrocarbyl phthalate, and at least one phlegmatization agent. The organic peroxide which can be employed in the composition has carbon atoms in the range from about 4 to about 36 and is selected from the group consisting of diacyl peroxide, ketone peroxide, peroxyester, dialkyl peroxide, diaryl peroxide, and mixtures thereof; any of which can be substituted or unsubstituted and can be aromatic, aliphatic, cyclic, or acylic.

Examples of suitable diacyl peroxides include, but are not limited to diacetyl peroxide, dibenzoyl peroxide, acetyl benzoyl peroxide, propionyl benzoyl peroxide, butyryl benzoyl peroxide, di(p-chlorobenzoyl) peroxide, di(2,4-dichlorobenzoyl) peroxide, and mixtures thereof. Examples of suitable ketone peroxides include, but are not limited to, cyclohexanone hydroperoxide, 3,5-dimethyl 3,5-dihydroxydioxolane-1,2, methyl ketone peroxide, and mixtures thereof. Examples of suitable peroxyesters include, but are not limited to, t-butyl peracetate, p-t-butyl perbenzoate, t-butyl permaleate, t-butyl perstearate, and mixtures thereof. Examples of suitable dialkyl peroxide include, but are not limited to, 2,5-dimethyl-2,5-di(t-butylperoxy)-hexane, 2,5-dimethyl-2,5-di(t-butylperoxy)-hex-3-yne, di-t-butyl peroxide, di-t-amyl peroxide, and mixtures thereof. An example of a suitable diaryl peroxide is diphenyl peroxide. The presently preferred organic peroxide is dibenzoyl peroxide because of its widespread use as a polymerization initiator.

Suitable hydrocarbyl phthalate for use in the present invention can contain carbon atoms in the range of from about 4 to about 40, preferably 6 to 12 because of their availability. Examples of suitable hydrocarbyl phthalate include, but are not limited to dimethyl phthalate, dibutyl phthalate, dicyclohexyl phthalate, dioctyl phthalate, didodecyl phthalate, diphenyl phthalate, di(p-chlorophenyl) phthalate, di(2,4-dichlorophenyl) phthalate, p-toluyl phthalate, and mixtures thereof. The presently preferred hydrocarbyl phthalate is dicyclohexyl phthalate because of its effectiveness and availability.

The polyester useful in the present invention can be any polyester that is commercially available. Examples of polyesters that can be used in the invention include, but are not limited to adipic acid polyester, azelaic acid polyester, sebacic acid polyester, and mixtures thereof. The presently preferred polyester is adipic acid polyester.

The glycol-based aliphatic carboxylic acid ester that can be employed in the present invention generally contains a long chain aliphatic acid moiety having a carbon chain length in the range of from about 10 to about 30, preferably from 16 to 20 carbon atoms. Examples of the presently preferred glycol-based aliphatic acid ester include, but are not limited to ethylene glycol laurate, ethyl glycol palmitate, ethylene glycol stearate, ethylene glycol tricosanoate, neopentyl glycol palmitate, neopentyl glycol stearate, neopentyl glycol cosanoate, neopentyl tricosanoate, propylene glycol stearate, trimethylene glycol stearate, triethylene glycol stearate, butylene glycol stearate, and mixtures thereof. The presently most preferred glycol-based aliphatic acid ester is neopentyl glycol stearate because of its effectiveness in achieving the advantage described hereinabove.

The composition of the present invention can contain the organic peroxide in the range of from about 10 to about 40%, preferably about 15 to about 40, and most preferably from 20 to 35 weight % of the composition. The composition of the present invention can contain the hydrocarbyl phthalate in the range of from about 20 to about 80, preferably about 20 to about 70, and most preferably 30 to 60 weight % of the composition. The composition of the present invention also can contain the phlegmatization agent in the range of from about 10 to about 40, preferably about 15 to about 40, and most preferably from 20 to 35 weight % of the composition. Total weight % of individual components equals 100. Individual components listed hereinabove are commercially available.

The compositions of the present invention can be prepared by mixing or blending methods generally known in the art. However, it is preferably prepared by the process described hereinbelow, for achieving the objects and advantages described in the Summary of the Invention, using the individual components whose scopes and quantities are described above.

A hydrocarbyl phthalate and at least one phlegmatization agent are generally first substantially dissolved in a solvent in a suitable vessel to form a plasticizer mixture. The choice of a suitable vessel is generally a matter of preference to one skilled in the art. The solvent generally must be capable of substantially dissolving the hydrocarbyl phthalate and phlegmatization agent. Examples of suitable solvents include, but are not limited to, water, pentane, hexane, 1-hexane, 2-hexane, heptane, octane, cyclohexane, ethanol, propanol, isopropanol, pentanol, acetone, methylethyl ketone, toluene, diethyl ether, tetrahydrofuran, diethylene glycol ethyl ether, N,N'-dimethylformamide, N-methyl-2-pyrrolidinone, and mixtures thereof. To better dissolve the hydrocarbyl phthalate and glycol-based aliphatic carboxylic acid ester. A surfactant such as, for instance, Triton X-200 ® (sodium alkylaryl polyether sulfonate, an anionic surfactant), can be optionally included in the solvent. The quantity of the surfactant, if present, is in the range of from about 0.05 volume or weight % to about 5 volume or weight % of the solvent used.

The temperature for preparing the plasticizer mixture can be varied widely from as low as about 10° C. to as high as about 150° C. The preferred temperature range is from about 20° C. to about 100° C. and most preferably from 25° C. to 80° C. The pressure is generally the pressure created by the solvent at the temperature of operation. It is therefore preferred that the vessel used for preparing the plasticizer mixture be a closed system and capable of sustaining the pressure created by heating the solvent. Time required for preparing the plasticizer mixture generally depends on the types and quantities of the hydrocarbyl phthalate, phlegmatization agent and solvent used. It will take at least about 0.3 minute to accomplish the formation of the plasticizer mixture. Generally, it takes at least about 1 minutes to ensure dissolution. The quantity of solvent also can be varied widely, depending on the type and quantity of the hydrocarbyl phthalate and phlegmatization agent used. Generally, the solvent used is in the range of about 3 to about 10 times the quantity of the plasticizer and phlegmatization agent employed.

An organic peroxide is generally then added to the plasticizer mixture under the same conditions described immediately above to substantially dissolve the organic peroxide to form an organic peroxide-plasticizer mixture. Thereafter, the organic peroxide-plasticizer mixture is cooled to a temperature of from about −50° C. to about 15° C., preferably 0° C. to 10° C. to crystallize the composition of the invention from the organic peroxide-plasticizer mixture.

Mechanical mixing such as, for example, preferably stirring is generally applied to the above-described steps of the process to obtain a substantially uniform compositions of the present invention.

The crystallized organic peroxide-plasticizer composition can be recovered by conventional means such as, for instance, filtration, decantation, centrifugation, and combinations thereof. The cómposition can be further purified by washing with a solvent. The applicable solvent and quantity thereof are generally the same as those used in the preparation of the plasticizer mixture. The composition can also be further dried under an atmospheric or reduced pressure such as, for example, 100 mm Hg at about 5° C. to about 5° C. below the melting point of the resulting organic peroxide compositions.

The following non-limiting examples are provided to further assist one skilled in the art to understand the present invention.

EXAMPLE I

The runs were carried out in a 1 liter, open-top glass reactor equipped with a stainless steel stir paddle and a jacket for heating and cooling. n-Heptane (250 ml) was added to the reactor and the contents were heated to 62°–65° C. using circulating water which was preheated in a Neslab Endocal, model RTE-9B, water bath. Dicyclohexyl phthalate (50 g) and a phlegmatization agent (25 g) shown in Table I were then added to the preheated solvent in the reactor, while the reactor content was being stirred with a stainless steel stir paddle, to form a plasticizer mixture.

Thereafter dibenzoyl peroxide (hereinafter referred to as BPO; 36.1 g of 69.21% BPO) was added to the plasticizer mixture, while stirring. The BPO went into solution within 3 minutes to form a BPO-plasticizer mixture.

The reactor containing the BPO-plasticizer mixture was then cooled in an ice bath to cool the content to 4° C. stirring was maintained during the cooling to avoid clumping of the product. Upon cooling, a solid product was formed which was then filtered through a Buchner funnel followed by washing with additional heptane (250 ml; 20° C.). The washed product was dried under atmospheric pressure for about 16 hours at 25° C. The results are shown in Table I.

TABLE I

| Run No. | Compositions Containing BPO[a] | | |
|---|---|---|---|
| | Phlegmatization Agent (25 g) | Yield (g) | Weight % BPO in Composition[b] |
| 1 | Supermix P-650[c] | 94.9 | 28.7 |
| 2 | Plasthall P-650[d] | 93.3 | 23.0 |
| 3 | RX-13303[e] | 94.0 | 27.4 |
| 4 | RX-13305[f] | 94.6 | 25.0 |

[a]Dicyclohexyl phthalate used was commercially available from Morflex, Inc. under the tradename of Morflex 150.
[b]Weight % BPO was measured by an iodometric titration method.
[c]Supermix P-650 is an adipic acid polyester commercially available from C. P. Hall Company, Chicago, Illinois.
[d]Plasthall P-650 is an adipic acid polyester commercially available from C. P. Hall Company, Chicago, Illinois.
[e]RX-13303 is an experimental sample of neopentyl glycol stearate obtained from C. P. Hall Company, Chicago, Illinois.
[f]RX-13305 is an experimental sample of propylene glycol stearate obtained from C. P. Hall Company, Chicago, Illinois.

The compositions obtained in Table I were non-dusting and substantially flowable, and had good appearance. Further testing of the compositions in a commercially available methyl methacrylate resin revealed that the invention compositions gave substantially longer working times with the corresponding polymerization mixtures than commercially available forms of BPO.

EXAMPLE II

This example illustrates that using water as solvent in the presence of Triton X-200® also produced BPO compositions having satisfactory results.

The runs were carried out in the same manner as those described in Example I except that water was used in place of heptane and Triton X-200® (1.25 ml or 0.5 volume %) was present in the solvent. The results are shown in Table II.

TABLE II

| Run No. | BPO Compositions Prepared by Using Water as Solvent[a] | | |
|---|---|---|---|
| | Glycol-based Stearate | Yield (g) | Weight % BPO in Composition |
| 11 | RX-13303 | 95.8 | 33.0 |
| 12 | RX-13305 | 95.2 | 32.8 |
| 13 | RX-13303 | 94.7 | 24.4 |

[a]See footnotes in Table I.

The compositions obtained in Table II were also non-dusting and substantially flowable, and had good appearance.

EXAMPLE III

This example illustrates that using a glycol ether, such as diethylene glycol ethyl ether, as a solvent also produced BPO compositions that had good appearance and were non-dusting as well as substantially flowable.

The runs were carried out in the same manner as those described in Example I except that diethylene glycol ethyl ether (Carbitol PM-600, Union Carbide Co.) was used in place of heptane. The results are shown in Table III.

TABLE III

| Run No. | Composition containing BPO[a] | | |
|---|---|---|---|
| | Glycol-based Ester | Yield (g) | Weight % BPO in Composition |
| 21 | RX-13303 | 90.6 | 28.6 |

[a]See footnotes in Table I.

EXAMPLE IV

This example illustrates that using a cosolvent system also produced BPO compositions having good appearance as well as being non-dusting and substantially flowable.

The runs were carried out in the same manner as those described in Example I except that a cosolvent system of diethylene glycol ethyl ether and water (3:1, volume) was used in place of heptane. The results are shown in Table IV.

TABLE IV

| Run No. | Composition containing BPO[a] | | |
|---|---|---|---|
| | Glycol-based Ester | Yield (g) | Weight % BPO in Composition |
| 31 | RX-13303 | 92.3 | 28.1 |

[a]See footnotes in Table I.

The results shown in the above tables demonstrate that the inventive BPO compositions had BPO levels less than 35%. Therefore, no yellow labels are required for these compositions. Yet all inventive compositions were non-dusting and substantially flowable as well as produced parts that had good appearance (i.e., no splotchy areas).

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising an organic peroxide, a hydrocarbyl phthalate, and a phlegmatization agent wherein said organic peroxide has about 4 to about 36 carbon atoms and said hydrocarbyl phthalate has about 4 to about 40 carbon atoms.

2. A composition according to claim 1 wherein said organic peroxide is selected from the group consisting of diacyl peroxide, ketone peroxide, peroxyester, dialkyl peroxide, diaryl peroxide, and mixtures thereof.

3. A composition according to claim 2 wherein said organic peroxide is diacyl peroxide.

4. A composition according to claim 3 wherein said organic peroxide is dibenzoyl peroxide.

5. A composition according to claim 1 wherein said hydrocarbyl phthalate is dicyclohexyl phthalate.

6. A composition according to claim 1 wherein said phlegmatization agent is selected from the group consisting of a polyester, a glycol-based aliphatic carboxylic acid ester, and mixtures thereof.

7. A composition according to claim 6 wherein said polyester is adipic acid polyester.

8. A composition according to claim 6 wherein said aliphatic carboxylic acid ester has about 10 to about 30 carbon atoms.

9. A composition according to claim 8 wherein said aliphatic carboxylic acid ester has 16 to 20 carbon atoms.

10. A composition according to claim 6 wherein said glycol-based aliphatic carboxylic acid ester is neopentyl glycol stearate.

11. A composition according to claim 6 wherein said glycol-based aliphatic carboxylic acid ester is propylene glycol stearate.

12. A composition according to claim 1 wherein said organic peroxide is present in said composition in the range of from about 10 to about 40 weight %.

13. A composition according to claim 12 wherein said range is from 20 to 35 weight %.

14. A composition according to claim 1 wherein said hydrocarbyl phthalate is present in said composition in the range of from about 20 to about 80 weight %.

15. A composition according to claim 14 wherein said range is from 20 to 70 weight %.

16. A composition according to claim 1 wherein said polymerization agent is present in said composition in the range of from about 10 to about 40 weight %.

17. A composition according to claim 16 wherein said range is from 20 to 35 weight %.

18. A composition according to claim 1 wherein said composition comprises from about 15 to about 40 weight % of said organic peroxide, from about 20 to about 70 weight % of said hydrocarbyl phthalate, and from about 15 to about 40 weight % of said glycol-based aliphatic carboxylic acid.

19. A composition according to claim 18 wherein said composition comprises from 20 to 35 weight % of said organic peroxide, from 30 to 60 weight % of said hydrocarbyl phthalate, and from 20 to 35 weight % of said glycol-based aliphatic carboxylic acid ester.

20. A composition according to claim 1 wherein said composition is prepared by the steps comprising: (1) substantially dissolving said hydrocarbyl phthalate and said phlegmatization agent in a solvent to form a plasticizer mixture; (2) substantially dissolving said organic peroxide in said plasticizer mixture to form an organic peroxide-plasticizer mixture; (3) cooling said organic-plasticizer mixture whereby a crystallized composition is formed; and (4) recovering said crystallized composition.

21. A composition according to claim 20 wherein said organic peroxide is dibenzoyl peroxide; said hydrocarbyl phthalate is dicyclohexyl phthalate; said phlegmatization agent is neopentyl glycol stearate; and said solvent is heptane.

22. A composition according to claim 20 wherein said organic peroxide is dibenzoyl peroxide; said hydrocarbyl phthalate is dicyclohexyl phthalate; said phlegmatization agent is propylene glycol stearate; and said solvent is heptane.

23. A composition according to claim 20 wherein said organic peroxide is dibenzoyl peroxide; said hydrocarbyl phthalate is dicyclohexyl phthalate; said phlegmatization agent is neopentyl glycol stearate; and said solvent is water.

24. A composition according to claim 23 wherein said solvent further comprises Triton X-200® which is sodium alkylaryl polyether sulfonate, an anionic surfactant.

25. A composition according to claim 20 wherein said organic peroxide is dibenzoyl peroxide; said hydrocarbyl phthalate is dicyclohexyl phthalate; said phlegmatization agent is adipic acid polyester; and said solvent is heptane.

26. A composition comprising an organic peroxide selected from the group consisting of diacyl peroxide, ketone peroxide, peroxyester, dialkyl peroxide, diaryl peroxide, and mixtures thereof; a hydrocarbyl phthalate dimethyl phthalate, dibutyl phthalate, dicyclohexyl phthalate, dioctyl phthalate, didodecyl phthalate, diphenyl phthalate, di(p-chlorophenyl) phthalate, di(2,4-dichlorophenyl) phthalate, p-toluyl phthalate, and mixtures thereof; and a phlegmatization agent selected from the group consisting of polyester, glycol-based aliphatic carboxylic acid ester, and mixtures thereof.

27. A composition according to claim 26 wherein said phlegmatization agent is glycol-based aliphatic carboxylic acid ester.

28. A composition according to claim 26 wherein said organic peroxide is dibenzoyl peroxide; said hydrocarbyl phthalate is dicyclohexyl phthalate; said polyester is adipic acid polyester; and said glycol-based carboxylic acid ester is selected from the group consisting of neopentyl glycol stearate, propylene glycol stearate, and mixtures thereof.

29. A composition comprising dibenzoyl peroxide, dicyclohexyl phthalate, and a glycol-based carboxylic acid ester selected from the group consisting of neopentyl glycol stearate, propylene glycol stearate, and mixtures thereof.

* * * * *